United States Patent [19]
Peters

[11] Patent Number: 4,774,984
[45] Date of Patent: Oct. 4, 1988

[54] LOW-NOISE PLUG VALVE

[75] Inventor: Mark E. Peters, Cookeville, Tenn.

[73] Assignee: The Duriron Company, Inc., Dayton, Ohio

[21] Appl. No.: 46,616

[22] Filed: May 7, 1987

[51] Int. Cl.⁴ ............................................. F16K 47/04
[52] U.S. Cl. ................................ 137/625.32; 251/127
[58] Field of Search ..................... 251/127; 137/625.32

[56] References Cited

U.S. PATENT DOCUMENTS

| | | |
|---|---|---|
| 223,573 | 1/1880 | Ainsworth ................. 137/625.32 X |
| 3,023,783 | 3/1962 | Vickery . |
| 3,974,860 | 8/1976 | Stead et al. . |
| 4,085,774 | 4/1978 | Baumann . |
| 4,212,321 | 7/1980 | Hulsey . |
| 4,364,415 | 12/1982 | Polon . |
| 4,479,510 | 10/1984 | Bey . |
| 4,530,375 | 7/1985 | Bey . |
| 4,540,025 | 9/1985 | Ledeen et al. . |

FOREIGN PATENT DOCUMENTS 1200688 11/1985 Fed. Rep. of Germany .
14024 6/1911 France ............................ 137/625.32

OTHER PUBLICATIONS

"Mechanical Engineering", Quiet, Even Flow, Jun. 1986, pp. 53–54.

Primary Examiner—Arnold Rosenthal
Attorney, Agent, or Firm—Biebel, French & Nauman

[57] ABSTRACT

A low-noise plug valve is formed with a plug in which one side wall of the plug is a grid defined by a plurality of small openings therethrough, which openings lead from the through passage of the plug to a region outside the plug and which grid is movable into partial flow-blocking relation with respect to the valve body outlet, in partially open positions of the plug. The grid creates a back pressure which suppresses the flashing and the formation of cavitation bubbles. The grid openings, in the partially open position of the plug, are in substantial alignment with the direction of flow.

5 Claims, 1 Drawing Sheet

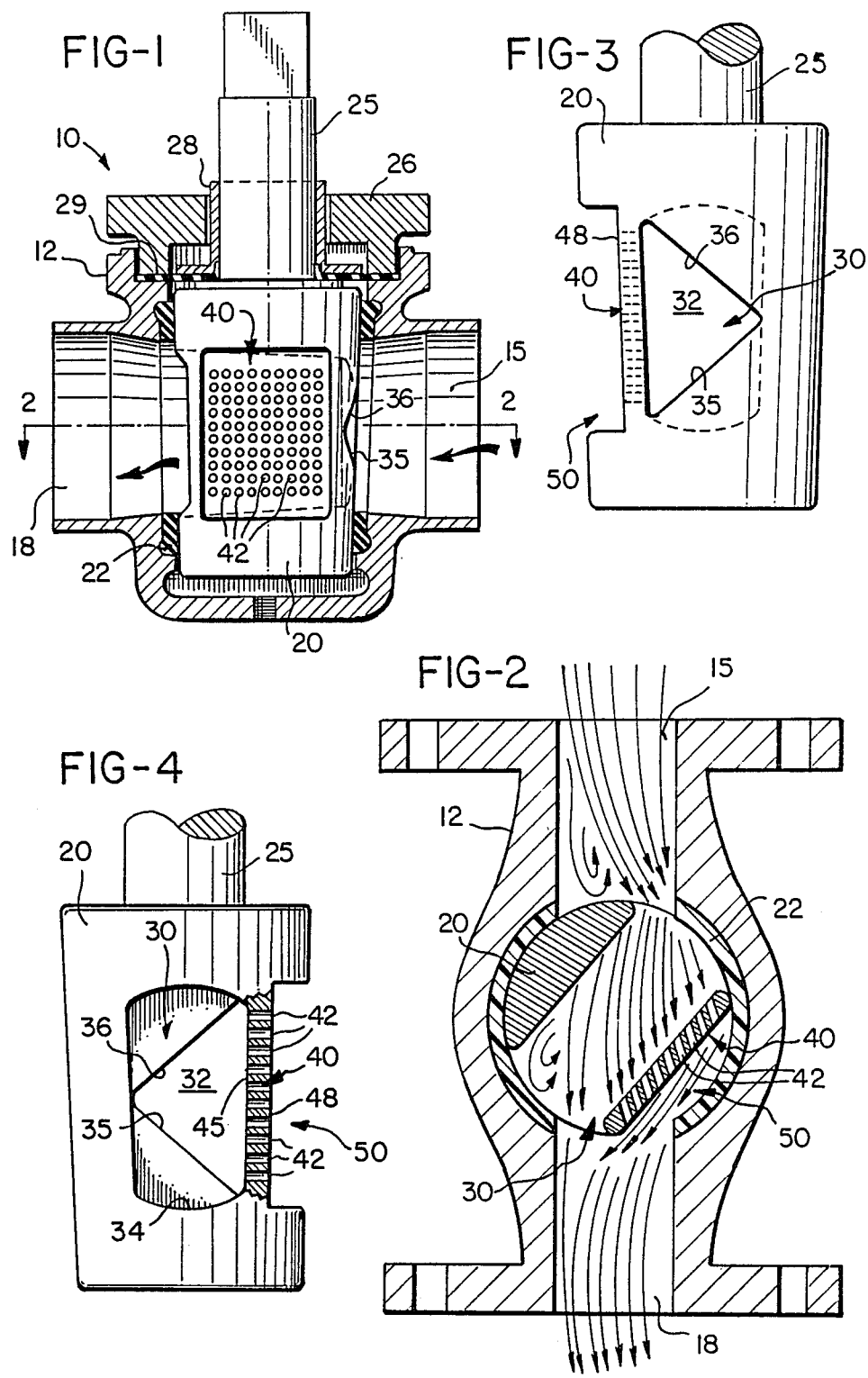

LOW-NOISE PLUG VALVE

BACKGROUND OF THE INVENTION

This invention relates to a low-noise plug valve and more particularly to a plug valve which may be operated in a throttled or partial flow blocking condition at substantially decreased sound levels as compared to conventional plug valves.

The problem of valve noise has been the subject of investigation, and valves have been designed for the purpose of reducing the generated noise. The problem of noise, in a plug-type valve, is difficult to control because of the straight through flow design defined by the plug through passage. Such designs have introduced high noise at medium to high pressure drops, due to flashing and cavitation.

Flashing occurs when the pressure downstream of a control valve, or a restriction, is less than the upstream vapor pressure, so that part of the liquid changes to the vapor state. Accordingly, bubbles of vapor are formed. Downstream, due to pressure recovery, the vapor bubbles rapidly condense back into the original liquid. As this process continues, the bubbles form, grow and collapse downstream, thereby causing conventional cavitation. Not only is this the major source of noise in a valve, it is also a source of physical injury to valve components, by reason of the shock waves which are created by the collapsing of the large cavitation voids or bubbles.

Most noise reduction concepts create a pressure drop in the valve, and the back pressure which is created reduces the possibilities of the liquid dropping below its vapor pressure. Examples of ball valves incorporating flow restrictors in the ball, which rotate with the ball, include Hulsey, U.S. Pat. No. 4,212,321 issued July 15, 1980 and Bey, U.S. Pat. No. 4,530,375 isssued July 23, 1985. In such designs, elements or components are added to the ball, such as by incorporating material in the through port of the ball or in a wall of the ball, providing a tortious or high resistance path for the liquid between the valve inlet and outlet. Such designs are not readily adaptable to plug-type valves, in which a straight or tapered plug, having a through passage, is rotatably mounted in a casing for controlling the flow of liquid from the inlet to the outlet. In particular, such designs do not lend themselves to incorporation into a V-port type of plug valve, in which the flow is roughly proportional to the angular position of the plug within the valve casing.

SUMMARY OF THE INVENTION

The invention is directed to a low-noise plug valve, and more particularly to a plug valve in which the plug component is provided with a control grid or wall defining one side of the passage, which wall is movable into partial flow-blocking relation between the valve inlet and the valve outlet. The wall is formed with a plurality of openings therethrough. The openings provide for a controlled throttling or diversion of the flow through the valve in the partially throttled or partially closed position of the plug. The plug at the flow control wall is relieved with respect to the valve in that a clearance space is defined between the grid or wall and the tapered plug opening in the valve body. The openings through the wall are aligned generally to the direction of flow between the valve inlet and valve outlet ports, so that flow of liquid through the plug passage may be diverted for flow through the valve outlet with a minimum of change of direction. Also, in partially throttled positions, the valve outlet port is unblocked with relation to the through passage through the plug, so that particles of material which could not pass through the openings, may proceed through the plug and into the outlet port.

A particular object and advantage of the plug-type control valve of this invention is that it provides decreased flashing and cavitation, and thereby substantially reduces noise. Further, the plug valve design is one which can take relatively high pressure drops across the valve without inducing cavitation and flashing at such high pressure drops.

The resulting low-noise, anti-cavitation grid is machined into one of the walls of the plug, so that the grid rotates in place as the valve is rotated into the throttling range. As mentioned above, the control grid defines at its outer surface a relief or clearance space with the inside wall of the valve body or liner. As the control grid is rotated into a position where it intercepts the flow through the valve, a diversion of flow through the wall takes place, while the main port remains at least partially open.

The openings in the control wall are formed at an angle with respect to the parallel spaced wall surfaces. The angle is such as to create a substantially straight path between the valve inlet and outlet over the throttling range, which may extend between 20 and 80 per cent of the port opening. The control grid improves the pressure recovery factor of the valve.

It is accordingly an object of this invention to provide a low-noise plug valve which incorporates a flow control grid, including a plurality of openings therethrough, which are movable into the flow path in the throttling range of the valve.

A further object of the invention is the provision of a plug-type valve having formed, as a portion of the plug, a control grid including a plurality of openings which are substantially aligned between the inlet and outlet ports in the throttling position of the valve plug.

An advantage of the invention includes the fact that the grid, as defined above, is particularly useful when combined in a V-port type of control valve. Such a plug valve is commonly designed to provide a proportional flow, according to the angular position of the valve plug.

These and other objects and advantages of the invention will be apparent from the following description, the accompanying drawings and the appended claims.

BRIEF DESCRIPTION OF THE DRAWINGS

FIG. 1 is a vertical sectional view through a plug valve, showing the valve plug in elevation, constructed according to this invention;

FIG. 2 is a somewhat diagrammatic transverse sectional view through the valve, with the plug rotated into the throttling range, looking generally along the line 2—2 of FIG. 1;

FIG. 3 is an elevational view of the valve plug, looking at the inlet side of the plug; and FIG. 4 is another elevational view of the plug, looking at the outlet side of the plug.

DESCRIPTION OF THE PREFERRED EMBODIMENT

Referring to the figures of the drawing which illustrate a preferred embodiment of the invention, a plug-type valve is illustrated generally at 10 in FIG. 1 as having a valve body 12 defining a inlet port 15 and an outlet port 18. The valve body is further provided with an internal lined and tapered opening for rotatably receiving a plug 20. The internal tapered opening is provided with a conventional liner sleeve 22, for isolating the inlet and outlet ports of the valve 10 with respect to the plug 20.

The valve plug 20 is provided with the usual stem 25 extending upwardly through the top of the valve body 12, the valve plug is retained by the conventional retainer 26, which may retain a packing sleeve 28 bearing against an annular gland or seal 29, for the purpose of sealing the region of the stem with respect to the valve body. For the simplicity of illustration, the usual packing gland follower and retainer bolts are not shown.

The valve plug 20 includes a through passage or port 30 leading from an inlet 32, as shown in FIG. 3, to an outlet 34, as shown in FIG. 4. The inlet is truncated by diagonal walls 35 and 36 defining a V-port opening 32 therebetween. As well known in the art, a V-port plug is one in which the flow through the valve is roughly proportional to the angular position of the stem 25, and is accordingly quite often run in a throttled or partially closed position.

As previously noted, where such operation is accompanied by large pressure drops across the valve, cavitation and flashing in the valve is a common occurrence, resulting in substantial noise. The invention is directed to a plug valve having an improved plug in which a control wall or grid 40 is machined into the plug, and which contains a plurality of throttling openings 42 therethrough. The wall 40 is formed with an inside wall surface 45 which is in common with the through port 30, and is further formed with a parallel outer wall surface 48. The surface 48, as shown in FIGS. 3 and 4, is a machined flat surface and defines a recess 56 with respect to the body opening.

The individual openings 42 formed in the grid or wall, as best shown in FIG. 2, are not normal to the surfaces of the inner wall 45 or outer wall 48, but rather are formed preferably at a common angle so as to be in substantial alignment with the flow from the valve inlet 15 to the outlet 18. In the throttled position, as shown in FIG. 2, flow occurs through the individual openings 42 formed in the wall 40, and this is accompanied by a minimum of change of direction of the flow, as indicated by the flow arrows on either side of the wall. Also, in the partially throttled position as shown in FIG. 2, in the event the valve is used in an application where particles may be found in the material to be controlled, if the particles cannot pass through the grid, they may readily continue through the through passage 30 and exit through the outlet 18.

Preferably, the openings 42 in the control grid or wall 40 are formed in a pattern which has a uniform density, that is the holes are equally spaced from each other, although a non-uniform density may in some instances be preferred. Each hole is of the same axial length, since the inlet and outlet walls defining the grid are parallel to each other. The holes may be machined by a numerical machine controlled drill or may be drilled by laser drilling or EDM drilling.

The number and sizes of the individual openings 42 defining the grid 40 may be subject to wide variation within the scope of the invention. Preferably, the openings for convenience are all the same diameter, and the size and openings may be calculated on a density basis. It has been found satisfactory to use openings of a diameter of 3/32 inch for two and three inch valves, and openings of 1/16 inch for one inch valves, with a density of 75%.

The grid 40 performs three major functions. It creates a back pressure which maintains the fluid pressure within the valve. Second, the small openings 42 through the grid reduce the size of the vapor bubbles which form upstream of the grid. Third, the jet stream effect, which can otherwise induce vapor bubbles into the fluid and create noise of its own, is substantially altered in the valve of this invention.

In the fully open position, the terminal outer edges of the plug at the wall occlude the liner so that the cavity of the plug behind or outwardly of the openings is sealed with respect to the inlet and outlet of the valve body.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A low-noise plug valve in which a plug is rotatably mounted in a valve body to control the flow between an inlet port and an outlet port, the improvement comprising:
   means in said plug defining a through passage,
   wall means in said plug defining one side of said through passage,
   said wall means having an outer surface defining a clearance space with the adjacent inside wall of said valve body and movable into partial flow-blocking relation with said valve body outlet port in partially closed positions of said plug, and
   means in said plug wall means defining a plurality of openings leading from said passage into said clearance space providing for throttled flow therethrough into said clearance space in partially closed positions of said plug.

2. The valve of claim 1 in which said openings are in the form of holes aligned generally in the direction of flow from said plug inlet port providing for diversion of flow therethrough.

3. The valve of claim 2 in which said wall means is of generally uniform thickness and said holes are arranged in a pattern defines a uniform distribution of holes in said wall means.

4. The valve of claim 3 in which the inside and outer surfaces defining said plug wall means are planar and parallel to each other.

5. The valve of claim 1 further comprising sealing means on said plug engageable with said body in the fully open position thereof isolating said cavity from said valve inlet and outlet ports.

* * * * *